Nov. 8, 1927.  
J. F. O'CONNOR  
1,648,318  
FRICTION SHOCK ABSORBING MECHANISM  
Original Filed Feb. 2, 1925   2 Sheets-Sheet 2
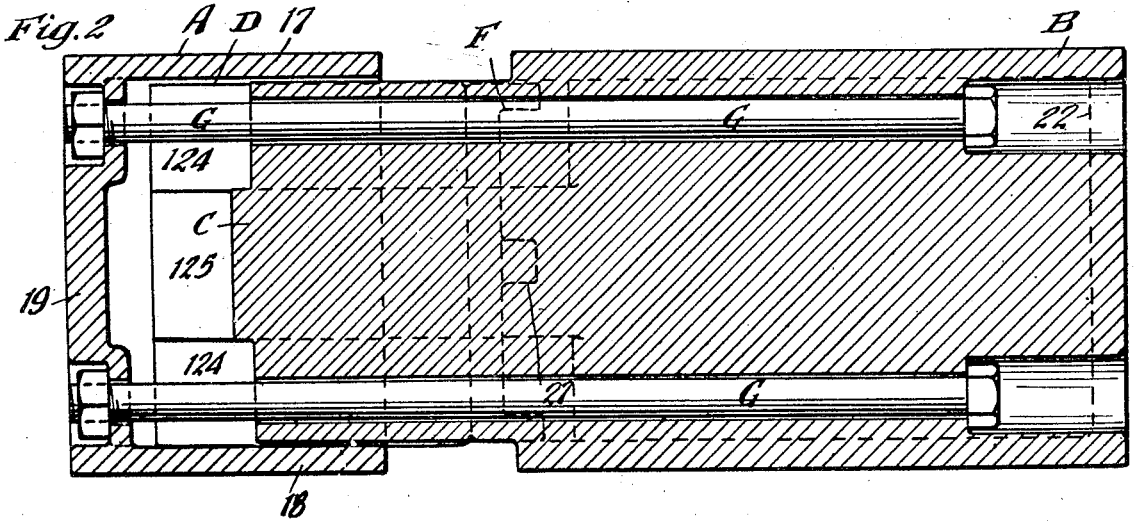
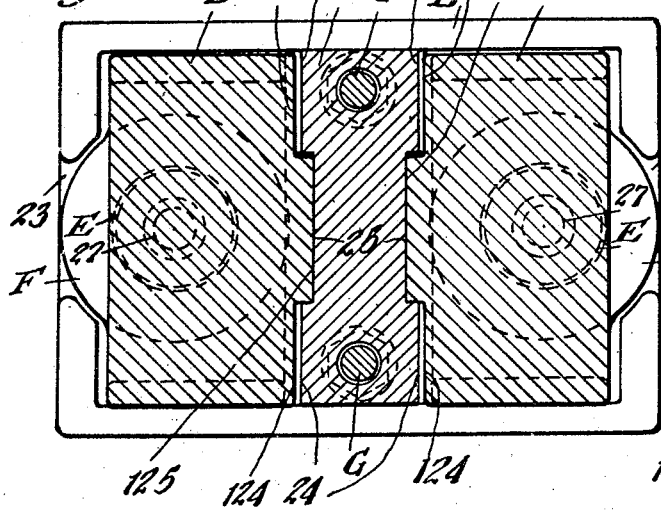
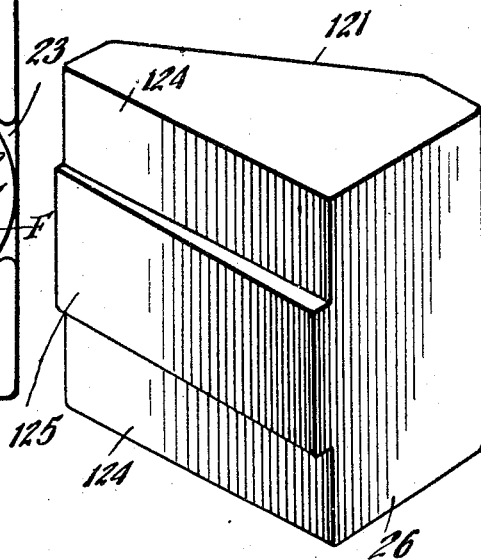

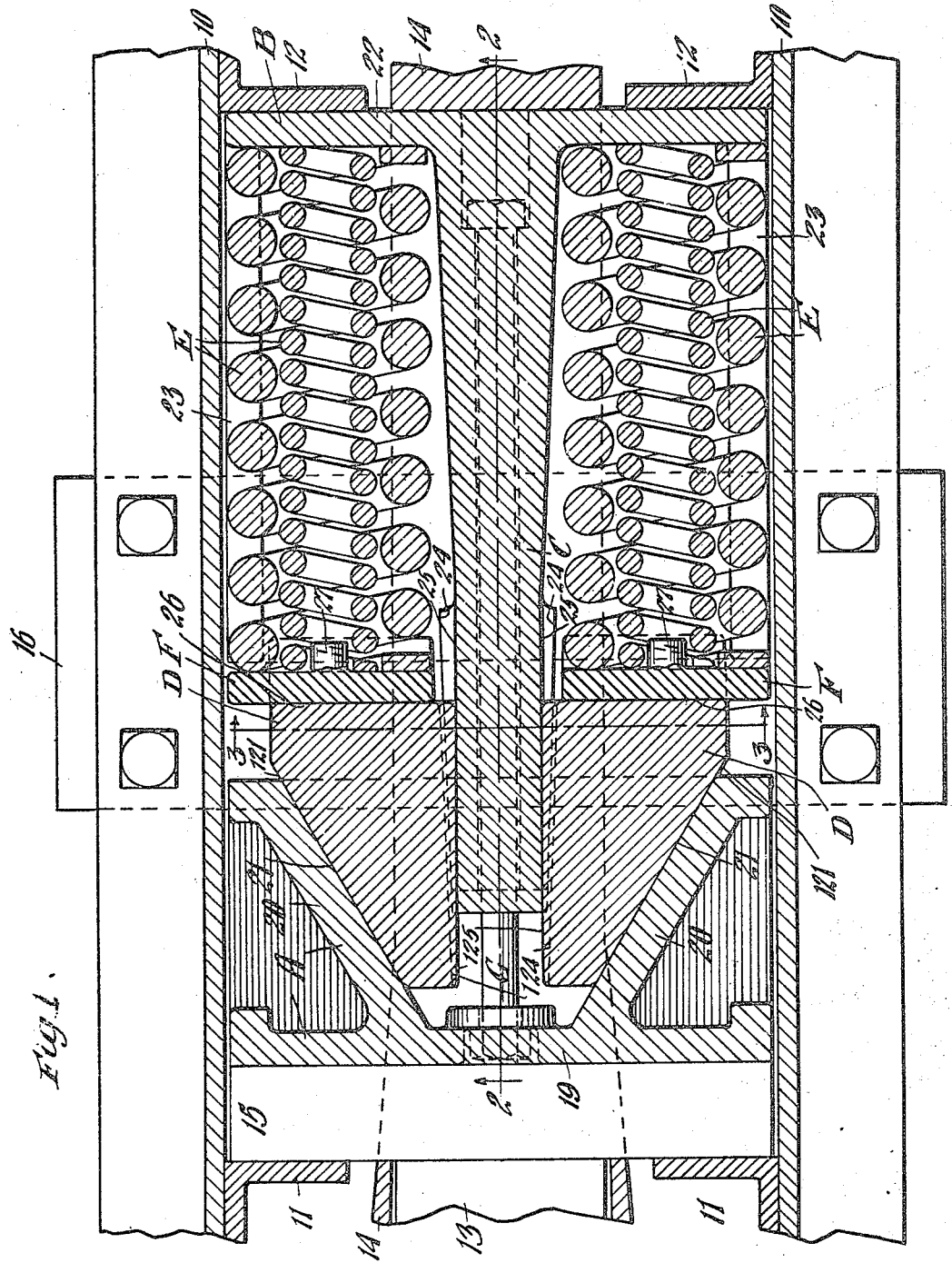

Patented Nov. 8, 1927.

1,648,318

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed February 2, 1925, Serial No. 6,224. Renewed May 21, 1927.

This invention relates to friction shock absorbing mechanisms.

One object of the invention is to provide a high capacity friction shock absorbing mechanism, including a plurality of relatively movable friction elements having cooperating friction surfaces adapted to develop a certain amount of preliminary frictional resistance followed by an increased, relatively high frictional resistance during the remainder of the compression stroke.

Another object of the invention is to provide a mechanism of the character indicated, especially adapted for railway draft riggings, including a plurality of relatively movable friction elements each having a plurality of friction surfaces, the corresponding surfaces of said elements being adapted to cooperate and said surfaces being operative in sequence to successively provide a certain amount of initial frictional resistance followed by a relatively heavier frictional resistance during the remainder of the compression stroke.

A more specific object of the invention is to provide a friction shock absorbing mechanism, including a friction post and cooperating friction shoes, the post and shoes having a plurality of longitudinally disposed cooperating friction surfaces, certain of which are disposed parallel to the longitudinal axis of the mechanism and others of which diverge longitudinally of the mechanism, together with means for pressing said shoes against the post and forcing the same longitudinally thereof.

In the drawings, forming a part of this specification, Figure 1 is a longitudinal, horizontal, sectional view of a portion of a railway draft rigging showing my improvements in connection therewith. Figure 2 is a vertical, longitudinal, sectional view corresponding substantially to the line 2—2 of Figure 1. Figure 3 is a vertical, transverse, sectional view corresponding substantially to the line 3—3 of Figure 1. And Figure 4 is a detailed, perspective view of a friction wedge shoe used in connection with my improved shock absorbing mechanism.

In the drawings, 10—10 indicate channel-shaped center or draft sills of a railway car underframe, to the inner surfaces of which are secured front stop lugs 11—11 and rear stop lugs 12—12. The inner end of the drawbar is indicated at 13, to which is operatively connected a hooded yoke 14 of usual construction. The shock absorbing mechanism, as well as a front main follower 15, is operatively disposed within the yoke. The yoke and the parts contained therein are operatively supported by a detachable saddle plate 16.

The improved shock absorbing mechanism proper, as shown, comprises broadly, a front follower casing A; a combined rear follower and spring cage B having a friction post C formed integral therewith; a pair of wedge shoes D—D; twin arranged main spring resistance elements E—E; spring followers F—F; and a pair of retainer bolts G—G.

The front follower casing A is of hollow construction, and comprises a top wall 17, a bottom wall 18, a transverse front end wall 19, and rearwardly diverging side walls 20—20. The front wall 19 bears directly on the inner surface of the main follower 15. The rearwardly diverging side walls are preferably reinforced by horizontally disposed webs. The inner surfaces of the side walls 20 present rearwardly diverging opposed wedge faces 21—21 adapted to cooperate with wedge shoes D.

The rear follower B is in the form of a generally rectangular casing having a transverse, vertically disposed end wall 22 adapted to cooperate with the rear stop lugs 12 in the manner of the usual rear follower. The friction post C extends forwardly from the rear wall 22 and is formed integrally with the top and bottom walls of the casing, the side walls of the casing being recessed as indicated at 23 to accommodate the corresponding sides of the main spring resistance elements.

As clearly shown in Figures 1 and 2, the forward end of the friction post C projects beyond the corresponding end of the casing. At the front end, the friction post C is provided with two sets of friction surfaces, the sets being disposed on opposite sides of the post. Each set comprises a pair of longitudinally disposed surfaces 24—24 slightly inclined with reference to the longitudinal axis of the mechanism, and an additional surface 25 disposed between the surfaces 24 and arranged parallel to the axis of the mechanism. As clearly shown in Figure 1, the surfaces 24 on opposite sides of the post diverge rearwardly of the mechanism and the surfaces 25 are disposed in parallel relation, the post being centrally cut away at opposite sides thereof to provide the parallel faces 25.

As clearly shown in Figures 1 and 2, in the normal full release position of the parts, the front end of the post is spaced a predetermined distance from the inner surface of the end wall 19 of the front follower, the distance being equal to the normal compression stroke of the mechanism. The front end of the casing B is also spaced a similar distance from the inner end of the casing A.

The friction wedge shoes D, which are preferably in the form of castings, are of like construction, each having an outer wedge face 121 and a flat inner end face 26 adapted to cooperate respectively with the corresponding wedge face 21 of the follower casing A and the flat front surface of the corresponding spring follower F. On the inner side each shoe is provided with a set of friction surfaces adapted to cooperate with one of the sets of friction surfaces of the post. The set of friction surfaces of each shoe comprises a centrally disposed surface 125, adapted to cooperate with the corresponding surface 25 of the post and a pair of surfaces 124 on opposite sides of the surfaces 125 adapted to cooperate with the corresponding, inclined friction surfaces 24 of the post. As clearly shown in Figure 4, the inner face of the shoe is cut away at opposite sides of the central friction surfaces 125 to provide the inclined friction surfaces 124.

The twin arranged spring resistance elements E are disposed on opposite sides of the friction post, each element having its front and rear ends bearing respectively on the corresponding spring follower F and the inner surface of the transverse end wall 22 of the follower B. Each member of the twin arranged spring resistance E comprises an inner, relatively light, and an outer, relatively heavier coil, the front end of the inner coil being held in central position with reference to the corresponding spring follower by a rearwardly projecting lug 27 thereon.

The retainer bolts G are two in number, and are arranged at the top and bottom of the mechanism, each bolt having the rear end thereof anchored to the follower B and the front end anchored to the casing A, the head of each bolt working in an elongated opening formed in the rear follower.

The normal position of the parts is that shown in Figure 1, with the friction surfaces 25 and 125 of the post and shoes in contact and the surfaces 24 and 124 in slightly spaced relation.

The operation of the device is as follows, assuming a buffing stroke of the mechanism. As the front follower 15 is forced inwardly, the casing A will be carried therewith, wedging the friction shoes D against the surfaces 25 of the post and carrying the shoes rearwardly on the latter. The described action will continue until the friction surfaces 24 and 124 of the post and shoes respectively come into engagement, whereupon the friction resistance will be transferred from the faces 25 and 125, to the faces 24 and 124. The shoes will be thus forced to slide on the faces 24 of the post during the remainder of the compression stroke. During the action last named, there will be slight lateral outward movement of the friction shoes due to the taper of the surfaces 24, causing the shoes to slip on the wedge faces of the casing A and also effecting a more rapid movement of the spring followers F inwardly of the mechanism than the casing A. An augmented resistance will thus be offered, and the springs will be compressed to a greater extent. This action will continue until either the actuating force is reduced or inward movement of the front follower casing A is limited by engagement of the inner end thereof with the front end of the follower casing B and engagement of the wall 19 of the casing A with the front end of the post C, whereupon the pressure will be transmitted directly through the follower casing B and the post to the rear stop lugs, the parts acting as a solid column and preventing the main springs from being driven solid. Upon reduction of the actuating force, the main springs E will effect restoration of all of the parts to normal position, outward movement of the casing A being limited by the retainer bolts G.

From the preceding description, taken in connection with the drawings, it will be evident that I have provided an exceedingly simple and inexpensive shock absorbing mechanism having relatively light frictional resistance during a predetermined initial compression of the mechanism, followed by a high frictional resistance during the remainder of the compression stroke.

It is pointed out that this result may be accomplished in various ways, and that my invention is not limited to disposing the set of friction surfaces, which first becomes operative, in parallel relation to the axis of the mechanism, it being within the invention to dispose all of the friction surfaces at an inclination to the longitudinal axis of the mechanism, the surfaces which first become operative being inclined to lesser degree than the remaining surfaces.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a friction element having a plurality of sets of longitudinally arranged friction surfaces, the surfaces of each set being angularly disposed with reference to each other; a plurality of friction shoes, each shoe having a plurality of friction surfaces cooperating with one of said sets of first named surfaces; pressure transmitting spreading means directly receiving the actuating force and engaging said shoes for forcing the same against said friction element and longitudinally thereof; and means yieldingly resisting movement of said shoes.

2. In a friction shock absorbing mechanism, the combination with a friction element having two sets of opposed, longitudinally arranged friction surfaces, the surfaces of each set being angularly disposed with reference to each other; a pair of friction wedge shoes, each shoe having a plurality of friction surfaces cooperating with one of said sets of first named surfaces and similarly disposed thereto; wedge pressure transmitting means directly receiving the actuating force engaging the shoes; and means yieldingly opposing movement of said shoes.

3. In a friction shock absorbing mechanism, the combination with a friction element having two sets of surfaces, each set being composed of surfaces disposed respectively parallel and at an inclination to the longitudinal axis of the mechanism; of a plurality of wedge friction shoes cooperating with the friction surfaces of said element, each shoe having a set of surfaces disposed respectively at an inclination and parallel to the axis of the mechanism and adapted to cooperate with one of the sets of friction surfaces of the friction element; wedge pressure transmitting means directly receiving the actuating force and cooperating with the shoes, said means having wedge faces relatively fixed with respect to each other; and means yieldingly resisting movement of said shoes.

4. In a friction shock absorbing mechanism, the combination with a friction element having two sets of friction surfaces, said sets being disposed on opposite sides of the longitudinal axis of the mechanism, each set comprising a central friction surface disposed parallel to the axis of the mechanism, and a pair of friction surfaces inclined with reference to the axis of the mechanism, said last named surfaces being on opposite sides of the central surfaces; of a pair of friction wedge shoes disposed on opposite sides of the mechanism, each shoe having a set of friction surfaces adapted to cooperate with one of said sets of friction surfaces of said element, the friction surfaces of each shoe being disposed parallel to the corresponding surfaces of the friction element; wedge pressure transmitting means cooperating with said shoes; and a main spring resistance.

5. In a friction shock absorbing mechanism, the combination with a central friction element having a plurality of sets of friction surfaces thereon; of a plurality of friction shoes movable relatively thereto, each shoe having a set of friction surfaces cooperating with one of the sets of friction surfaces of the central element, certain of said cooperating surfaces of said last named sets being disposed parallel to the axis of the mechanism and the remaining cooperating surfaces thereof being inclined to said axis; wedge pressure transmitting means cooperating with said shoes; and a main spring resistance.

6. In a friction shock absorbing mechanism, the combination with a friction post, said post having parallel friction surfaces on the opposite sides thereof, said post also having friction surfaces on the opposite sides thereof diverging longitudinally of the mechanism; of friction shoes cooperating with said post, each of said shoes having friction surfaces correspondingly disposed to and cooperating with the friction surfaces on one side of the post; wedge means cooperating with the shoes; and means for yieldingly resisting movement of the shoes.

7. In a friction shock absorbing mechanism, the combination with a central friction post, said post having a plurality of friction surfaces thereon, said post also having additional friction surfaces inclined with respect to said first named surfaces; of friction shoes relatively movable to said post, said shoes having friction surfaces successively cooperating with the first and second named post friction surfaces; wedge pressure transmitting means cooperating with said shoes; and means yieldingly opposing movement of the shoes.

8. In a friction shock absorbing mechanism, the combination with front and rear follower acting members, one of said members having a friction post extending therefrom and the other member having interior wedge faces; of friction shoes cooperating with said post, each shoe having a wedge face cooperating with one of said follower faces, said post and each shoe having engaging friction surfaces inclined with respect to the axis of the mechanism, and said post and each shoe having additional cooperating friction surfaces angularly disposed with reference to said inclined friction surfaces; and means yieldingly resisting movement of the shoes.

9. In a friction shock absorbing mechanism, the combination with a follower-acting member and means associated therewith provided with a plurality of relatively longitudinally extending friction surfaces disposed at different distances from the center line of the mechanism; of a plurality of devices movable longitudinally with respect to said means and friction surfaces, said devices being provided with friction surfaces disposed also at different distances from the center line of the mechanism, certain of said surfaces co-acting during the initial portion of a compression stroke and, thereafter, others of said surfaces during the final portion of a compression stroke; a spring resistance; and wedge-pressure transmitting means directly actuated by said follower member and co-operable with said devices to effect the longitudinal movement thereof and maintain the frictional surfaces thereof in contact with the frictional surfaces of said means.

In witness that I claim the foregoing I have hereunto subscribed my name this 31st day of January, 1925.

JOHN F. O'CONNOR.